Nov. 9, 1965   M. D. McFARLANE   3,216,255
FLUID LEVEL INSTRUMENTATION
Filed Feb. 15, 1962

INVENTOR
Maynard D. MC Farlane

BY  *Herbert M. Birch*
ATTORNEY

United States Patent Office 3,216,255
Patented Nov. 9, 1965

3,216,255
FLUID LEVEL INSTRUMENTATION
Maynard D. McFarlane, Tustin, Calif., assignor to Robertshaw Controls Company, Richmond, Va., a corporation of Delaware
Filed Feb. 15, 1962, Ser. No. 173,451
6 Claims. (Cl. 73—290)

This invention relates to fluid level measuring devices, and more particularly, to fluid level measuring devices of the float varied capacitance type.

The use of a float to measure liquid level presents a major problem in transmitting the level varied float movement from the interior of a closed container, housing the fluid being monitored as to level, to the exterior of the container, whereby a suitable readout device may be actuated thereby to provide an indication of the fluid level within the container. Aside from the difficulty, however, a float is a very accurate, desirable and foolproof fluid level measuring means.

The use of the fluid in a container as the dielectric in an electrical capacitor which is varied with a change in fluid level is a means to obviate the difficulty of a motion output from a float. However, this type of fluid level instrumentation is subject to variations in the dielectric constant of the various fluid being monitored so that, in some cases, extreme sensitivity is necessary to properly monitor changes in fluid level. For example, in systems wherein small increments of fluid level and correspondingly small capacity changes must be detected, the dielectric constant of the fluid is often such that the residual capacitance of the system is very high. Thus, changes such as one (1) part in four hundred (400) are not uncommon and on a production basis present a major problem in quality control.

It is, therefore, an object of this invention to provide a fluid level transducer incorporating a float controlled capacitance, whereby the accurate level detecting motion of the float may be transduced to an electrical output entirely within a closed fluid container.

Still another object of this invention is to provide a fluid level transducer including a float for detecting a change in fluid level within a closed container, a variable electrical impedance element within said container varied in response to the motion of said float and a single insulated electrical output connection extending through said container for transmitting the electrical impedance variation to the exterior of the said container as an indictaion of the fluid level therein.

Figure 1:
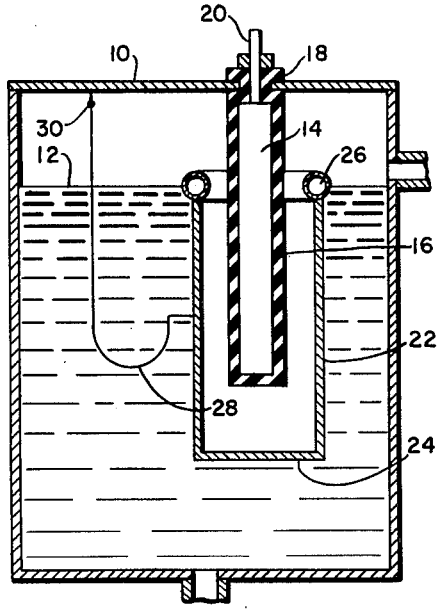
Figure 2:
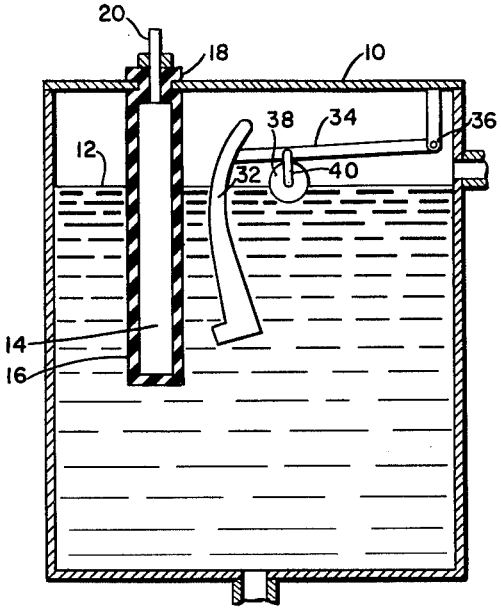
Figure 3:
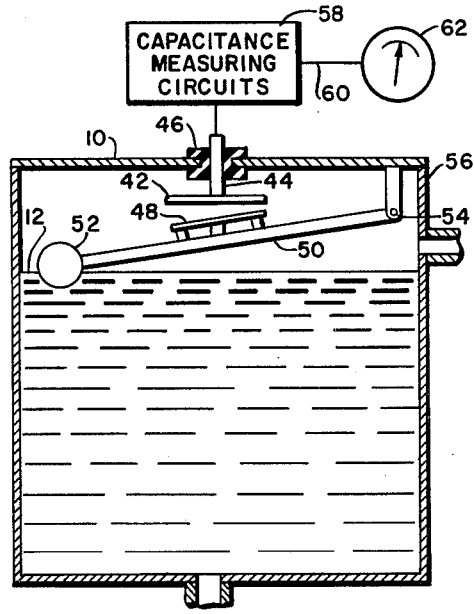
Figure 4:
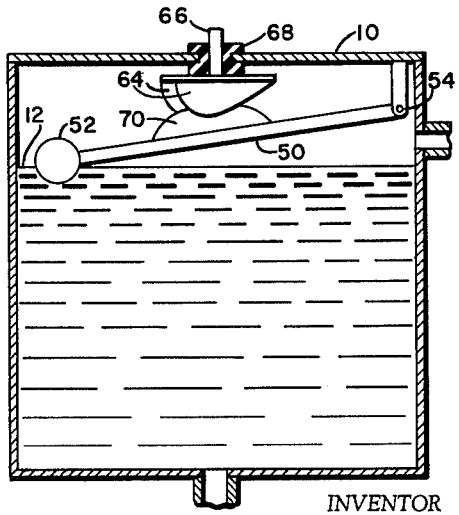

These and other objects of this invention will become apparent with reference to the following specification and drawings which relate to several preferred embodiments of the invention:

In the drawings:
FIGURE 1 is a schematic showing of one embodiment of the invention;
FIGURE 2 is a schematic showing of another embodiment of the invention;
FIGURE 3 is a schematic showing of still another embodiment of the invention; and
FIGURE 4 is a schematic showing of yet another embodiment of the invention.

Referring in detail to the drawings and more particularly to FIGURE 1, a tank 10 having a fluid 12 contained therein is generally shown.

The fluid level transducer in this embodiment is shown as including a probe electrode 14 molded or otherwise enclosed in a dielectric sheath 16 including an insulating bushing portion 18 which forms a through-connection with the wall of the tank 10. An output lead or terminal stud 20 extends from the probe electrode 14 through the bushing 18 to a suitable external metering circuit not shown.

The probe 14 extends from the upper part of the tank 10 down through the confined fluid 12 to a point determined by the range of fluid level variation to be monitored. The remainder of the fluid level transducer comprises a conductive tube or sheath 22, having a closed lower end 24, positioned substantially concentrically with the probe electrode 14 and being of sufficient length to fully receive the said probe 14 when the level of the fluid 12 in the tank 10 is at a maximum.

The conductive tube or sheath 22 is not buoyant and is submerged in the fluid 12. However, the open upper end thereof comprises an integral annular float member 26 which maintains the upper end of the said tube 22 at the exact level of the fluid 12 in the tank 10. The conductive sheath 22 is grounded via a lead 28 to a point 30 on the wall of the tank 10.

In operation, when the level of the fluid 12 changes, the float 26 causes the conductive sheath 22 to move in telescopic fashion along the fixed probe electrode 14. The fixed conductive probe 14, the dielectric sheath 16 thereon and the moving conducting sheath 22 thus form a variable electric capacitor which varies in capacitance in proportion to the variations in the level of the fluid 12 in the tank 10. As will be later generally indicated in FIGURE 3 herein, suitable capacitance change detecting means and an indicating instrument controlled thereby may be connected with the output lead 20, whereby the change in level of the fluid 12 may be monitored.

By preventing the fluid 12 from contacting the probe 14 and sheath 16, the dielectric constant of the fluid 12 has no effect on the calibration of the transducer or the monitoring system of which it is a part.

Referring now to FIGURE 2, the probe electrode 14, the insulating sheath 16 thereon, the insulating bushing 18 and the output lead 20 are shown mounted in the tank 10 and submerged in the fluid 12. In this embodiment, however the movable element of the capacitor and the probe 14 are both in contact with the fluid 12.

The variable element of the capacitor is shown as comprising a curvilinear electrode 32 substantially longitudinally and transversely coextensive with the said fixed probe electrode 14 mounted on one end of a swinging float arm 34 pivoted at its other end by means of a hinge 36 to the wall of the tank 10. A float member 38 is connected intermediate the ends and beneath the arm 34 by means of a connecting link 40 pivoted to the float 38 and fixed to the arm 34. The arm 34 and hinge connection 36 are electrically conductive and serve as a ground connection to the tank 10 for the curvilinear electrode 32.

The shape of the curvilinear electrode 32 is predetermined such that motion thereof longitudinally of the fixed probe electrode 14 and arcuately about the hinge 36 in response to changes in the level of the fluid 12 will produce a capacitance change at the probe 14 which is a predetermined function of the change in level. For example, the shape of the curvilinear electrode 32 may be such as to cause a linear increase in capacitance as the fluid level rises in the tank 10, carrying the float 38 therewith. The float 38 forces the arm 34 up about the hinge 36 causing the curvilinear electrode to translate upwardly along the length of the fixed proble electrode 14. Since, as shown, the curvilinear electrode 32 has a variable radius curve on the surface thereof adjacent the fixed electrode 14 and since it is arcuately moving on a fixed radius determined by the arm 34, the effect on the capacitance between the fixed probe electrode 14, the insulating sheath 16 thereon and the curvilinear electrode 32 is to vary the same as a function of the variable radius curve on the surface of the said curvilinear electrode 32 and the liquid level as detected by the float 38.

Referring now to FIGURE 3, the tank 10 and fluid 12 therein are again shown. In this embodiment, however, neither of the elements of the variable capacitor are submerged in the fluid 12.

The fixed or probe electrode comprises a conductive plate 42, having an output electrode 44 thereon, mounted within the tank 10 by means of an insulating bushing 46 mounted in the tank wall and enclosing the output electrode 44.

The moving electrode comprises a second conductive plate 48, fixedly mounted intermediate the ends of a swinging arm 50, adjacent and below the fixed conducting plate or electrode 42. One end of the arm 50 is integral with a fluid level detecting float 52, while the other end of the arm 50 is pivotedly mounted to the wall of the tank 10 via a hinge 54. The arm 50 and hinge connection 54 are electrically conductive and thereby provide a ground connection between the second or moving electrode 48 and the tank 10.

The output electrode 44 is connected via a lead 56 to a capacitance measuring circuit 58 which is shown as being connected via a lead 60 to energize a meter or other suitable readout device 62. This type of circuit for detecting the fluid level changes as a function of a change in capacitance may be used for all of the embodiments herein.

As in the embodiment of FIGURE 2, the plates 42 and 48 may be shaped such that variations in capacitance will be a predetermined function of a change in the level of the fluid 12.

In the embodiment of FIGURE 3, as illustrated, with the plates 42 and 48 being flat and planar, a non-linear change in capacitance with change in fluid level, characterized by a very rapid increase in capacitance as the plates become close together, is effected. The output response is thus very useful in initiating the response of a trigger device to a predetermined level of the fluid 12, since a minimum of movement of the second electrode 48 subsequent to the attaining of that level will produce a large output signal in response to the corresponding large capacitance change.

The embodiment of FIGURE 4 is a modified version of FIGURE 3 in that the fixed or probe portion of the capacitor comprises a plurality of spaced parallel plates 64 suspended via an output electrode 66 from an insulating bushing 68 in the wall of the tank 10. A cooperating plate or plates 70 parallel and interleavable with the fixed plates 64 are mounted on the float arm 50 as in FIGURE 3. The float 52 and the hinge 54 on the arm 50 are identical with that of FIGURE 3.

The interleaved plates 64 and 70 may be selectively shaped, as shown, to provide a capacitance variation which is a predetermined function of the variation in the level of the fluid 12.

As distinguished from FIGURE 3, the embodiment of FIGURE 4 provides a much greater capacitance change, by way of the interleaved plates 64 and 70, for like magnitudes of change in fluid level.

In the embodiments of both FIGURES 3 and 4, as in FIGURE 1, the calibration of the system is not dependent upon the dielectric constant of the fluid being monitored.

In the embodiments of FIGURES 1, 3, and 4, the residual capacitance is maintained at a minimum whereby sufficient sensitivity for accurate fluid level control and/or monitoring is readily attainable.

As can be seen from the foregoing specification and drawings, this invention provides new and novel fluid level transducers comprising float operated variable capacitors which provide an electrical output as an indication of fluid level in a closed container in response to a motion input provided by a float in the fluid.

It is to be understood that the various embodiments shown and described herein are for the purpose of example only and are not intended to limit the scope of the appended claims.

What is claimed is:

1. A fluid level transducer for providing an electrical output signal in response to a change in the level of a fluid in a container, comprising a variable capacitor, including a fixed electrode and a movable electrode adjacent thereto, said fixed electrode comprising a conductive probe extending from a wall of the container above the fluid therein to a point below the surface of said fluid and said movable electrode extending below the surface of said fluid, and float means connected with said movable electrode and engaging the surface of said fluid, whereby variations in the level of said fluid cause a corresponding variation in the position of said float means and said movable electrode to thereby cause a change in capacitance in said capacitor as a function of fluid level in said container.

2. The invention defined in claim 1, wherein said probe includes an external dielectric sheath thereon.

3. A fluid level transducer for providing an electrical output signal in response to a change in the level of a fluid, said fluid and said transducer being confined in a container, comprising a variable capacitor, including a fixed electrode mounted on an interior portion of said container and a movable electrode adjacent thereto, and float means connected with said movable electrode and immersed in said fluid, said float means and said movable electrode being completely confined within said container; whereby variations in the level of said fluid cause a corresponding variation in the posititon of said float means and said movable electrode to thereby cause a change in capacitance in said capacitor as a function of fluid level in said container, wherein said fixed electrode comprises a conductive probe extending from a wall of said container above the fluid therein to a point below the surface of said fluid, said probe having an external dielectric sheath thereon; and wherein said movable electrode comprises a substantially tubular conductive electrode having an open upper end and a lower end for telescopically and concentrically receiving that portion of said fixed electrode beneath the surface of said fluid and preventing said fluid from contacting said fixed electrode, said movable electrode being grounded to a wall of said container.

4. The invention defined in claim 3, wherein said float means comprises an annular float integral with the periphery of the upper open end of said movable tubular electrode, whereby said movable electrode is telescopically positioned longitudinally of said fixed electrode in response to changes in the level of said fluid in said container.

5. A fluid level transducer for providing an electrical output signal in response to a change in the level of a fluid, said fluid and said transducer being confined in a container, comprising a variable capacitor, including a fixed electrode mounted on an interior portion of said container and a movable electrode adjacent thereto, and float means connected with said movable electrode and immersed in said fluid, said float means and said movable electrode being completely confined within said container, whereby variations in the level of said fluid cause a corresponding variation in the position of said float means and said movable electrode to thereby cause a change in capacitance in said capacitor as a function of fluid level in said container; wherein said fixed electrode comprises a conductive probe extending from a wall of said container above the fluid therein to a point below the surface of said fluid, said probe having an external dielectric sheath thereon; and wherein said movable electrode comprises a curvilinear member, immersed in said fluid, substantially transversely and longitudinally coextensive with said fixed electrode, and mounted on said float means such that a variation in the level of said fluid causes a motion of said curvilinear member along a fixed radius arc adjacent said fixed electrode, said curvilinear member being so shaped and so proportioned as to produce a capacitance change, detectable at said fixed electrode, which is a predetermined function of a change in the level of said fluid.

6. The invention defined in claim 5, wherein said float means comprises a radius arm, above the surface of said fluid, connected at one end to said curvilinear member and pivoted at the other end to a wall of said container and a float connected intermediate the ends of said radius arm, whereby arcuate motion is imparted to said curvilinear member about the pivoted end of said radius arm in response to changes in the level of said fluid.

References Cited by the Examiner
UNITED STATES PATENTS

| | | | |
|---|---|---|---|
| 1,946,924 | 2/34 | Allen et al. | 33—148 |
| 2,288,838 | 7/42 | Pike | 33—147 X |
| 2,334,543 | 11/43 | Connolly | 33—172 |
| 2,700,901 | 2/55 | Rickner | 73—304 |
| 3,041,512 | 6/62 | Zeigler | 137—412 |
| 3,124,000 | 3/64 | Melas | 73—308 X |

ISAAC LISANN, *Primary Examiner.*